(12) United States Patent
Baggett et al.

(10) Patent No.: US 10,754,858 B2
(45) Date of Patent: *Aug. 25, 2020

(54) ADAPTIVE MULTI-INDEX ACCESS PLAN FOR DATABASE QUERIES

(71) Applicant: International Business Machines Corporation, Armonk, NY (US)

(72) Inventors: Brian L. Baggett, Renton, WA (US); Patrick D. Bossman, Sarasota, FL (US); Shuanglin Guo, Cupertino, CA (US); Andrei F. Lurie, San Jose, CA (US); Terence P. Purcell, Springfield, IL (US); Martina Simova, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 683 days.

This patent is subject to a terminal disclaimer.

(21) Appl. No.: 15/400,102

(22) Filed: Jan. 6, 2017

(65) Prior Publication Data

US 2017/0116264 A1    Apr. 27, 2017

Related U.S. Application Data

(63) Continuation of application No. 14/919,026, filed on Oct. 21, 2015, now Pat. No. 10,210,210.

(51) Int. Cl.
*G06F 16/24* (2019.01)
*G06F 16/2453* (2019.01)
(Continued)

(52) U.S. Cl.
CPC .... *G06F 16/24545* (2019.01); *G06F 16/2455* (2019.01); *G06F 16/2462* (2019.01);
(Continued)

(58) Field of Classification Search
CPC ......... G06F 16/24524; G06F 16/24545; G06F 16/24549; G06F 16/2455; G06F 16/2462; G06F 16/9535
(Continued)

(56) References Cited

U.S. PATENT DOCUMENTS 5,734,884 A    3/1998    Eberhard
6,006,220 A    12/1999   Haderle et al.
(Continued)

OTHER PUBLICATIONS

Kabra et al., "Efficient mid-query re-optimization of sub-optimal query execution plans." ACM SIGMOD Record. vol. 27. No. 2. ACM, 1998.
(Continued)

*Primary Examiner* — Robert W Beausoliel, Jr.
*Assistant Examiner* — Nirav K Khakhar
(74) *Attorney, Agent, or Firm* — Richard Wilhelm; Edell, Shapiro & Finnan, LLC

(57) ABSTRACT

An access plan including multiple indexes is selected for accessing data of a database system. A filtering status of each index within the selected access plan is determined based on information available at execution of the selected access plan. The order of the indexes within the selected access plan is modified based on the filtering status of the indexes, and the selected access plan is executed with the modified order of the indexes. The execution of the selected access plan is interrupted in response to accessing a threshold amount of data and the filtering of the indexes of the selected access plan is estimated. A processing order for the indexes is determined based on the estimated filtering. The execution of the selected access plan resumes based on the determined processing order.

8 Claims, 3 Drawing Sheets

(51) Int. Cl.
  *G06F 16/2455* (2019.01)
  *G06F 16/2458* (2019.01)
  *G06F 16/9535* (2019.01)
  *G06F 16/2452* (2019.01)
(52) U.S. Cl.
  CPC .. *G06F 16/24524* (2019.01); *G06F 16/24549* (2019.01); *G06F 16/9535* (2019.01)
(58) Field of Classification Search
  USPC .......................................................... 707/718
  See application file for complete search history.

(56) References Cited

U.S. PATENT DOCUMENTS

| | | |
|---|---|---|
| 6,219,660 B1 | 4/2001 | Haderle et al. |
| 6,763,359 B2 | 7/2004 | Lohman et al. |
| 6,947,934 B1 | 9/2005 | Chen |
| 7,698,253 B2 | 4/2010 | Hrle |
| 7,739,269 B2 | 6/2010 | Chaudhuri et al. |
| 7,779,038 B2 | 8/2010 | Adler |
| 8,082,265 B2 | 12/2011 | Carlson et al. |
| 9,710,511 B2 | 7/2017 | Wright |
| 2003/0182276 A1 | 9/2003 | Bossman |
| 2005/0198008 A1 | 9/2005 | Adler |
| 2006/0136368 A1 | 6/2006 | Young-Lai |
| 2006/0184338 A1 | 8/2006 | Lightstone |
| 2008/0270371 A1 | 10/2008 | Fiebig |
| 2009/0077013 A1 | 3/2009 | Hu et al. |
| 2009/0259624 A1 | 10/2009 | DeMaris |
| 2009/0307184 A1 | 12/2009 | Inouye |
| 2009/0327266 A1 | 12/2009 | Tankovich |
| 2010/0299337 A1 | 11/2010 | Aurin |
| 2012/0072412 A1 | 3/2012 | Bestgen |
| 2012/0158698 A1 | 6/2012 | Bestgen |
| 2012/0330964 A1 | 12/2012 | Baude |
| 2013/0073538 A1 | 3/2013 | Beerbower |
| 2013/0086038 A1 | 4/2013 | Perry |
| 2013/0262435 A1 | 10/2013 | Bossman et al. |
| 2014/0081985 A1 | 3/2014 | Bentley |
| 2015/0286682 A1 | 10/2015 | Ziauddin |
| 2017/0116275 A1 | 4/2017 | Baggett |

OTHER PUBLICATIONS

Ng et al. "Dynamic query re-optimization." Scientific and Statistical Database Management, 1999. Eleventh International Conference on. IEEE, 1999.

Ghazal et al., "Recursive sql query optimization with k-iteration lookahead." Database and Expert Systems Applications. Springer Berlin Heidelberg, 2006.

Markl et al. "Robust query processing through progressive optimization." Proceedings of the 2004 ACM SIGMOD International conference on Management of data. ACM, 2004.

Babu et al., "Proactive re-optimization." Proceedings of the 2005 ACM SIGMOD international conference on Management of data. ACM, 2005.

Stillger et al., "LEO—DB2's LEarning Optimizer", VLDB '01 Proceedings of the 27th International Conference on Very Large Data Bases, Morgan Kaufmann Publishers Inc., San Francisco, CA, USA, 2001, pp. 19-28.

List of IBM Patents or Patent Applications Treated as Related, Jan. 6, 2017.

ADAPTIVE MULTI-INDEX ACCESS PLAN FOR DATABASE QUERIES

CROSS-REFERENCE TO RELATED APPLICATIONS

This application is a continuation of U.S. patent application Ser. No. 14/919,026, entitled "ADAPTIVE MULTI-INDEX ACCESS PLAN FOR DATABASE QUERIES" and filed Oct. 21, 2015, the disclosure of which is incorporated herein by reference in its entirety.

BACKGROUND

1. Technical Field

Present invention embodiments relate to database query optimization, and more specifically, to optimizing the database access plan adaptively at query execution.

2. Discussion of the Related Art

One of the most significant challenges in query optimization is accuracy in selectivity (filter factor) estimation for simple and compound predicates. For simple predicates with literal values, solutions exist regarding statistics collection of frequency statistics and/or histogram (quantiles) to improve selectivity estimation. However, statistics collection and identification of the need for statistics can be cumbersome.

The majority of online transaction processing (OLTP) applications in a relational database management system use host variables or parameter markers to allow re-use of the same query statement. This means that at access path selection time, the actual literals are not yet known, and thus frequency or histogram statistics become less effective.

One current technique to address this issue is by re-optimization of the access path once the literals are known. This adds overhead of requiring a new re-optimization of the statement at each execution, and this overhead results in reduced adoption of this feature for customers with online transactional workloads.

Other techniques include parametric plans, where multiple plans are stored and switched between each stored plan at execution time based upon the literals used. The downfall of this approach is the need to either predict which combinations of filtering may occur or to track and store a minimum number of the most common plans at execution time. This technique still requires re-optimization when a candidate plan is not already stored, and also introduces challenges to determine the ranges of selectivity when each plan is optimal. Complexity of such a solution increases as the number of predicates increase.

Random sampling of literals has also been explored, whereby either a single weighted average access path is produced or one access path per literal set. However, this option targets repeating queries and therefore does not address cases where filtering changes dramatically with each query statement execution. Also, this technique involves a learning period so that the representative sample can be captured.

Accurately estimating actual execution time filtering in a practical and efficient manner for high volume transaction workloads is an ongoing research and development concern. Despite significant research in this field, an efficient solution for mission critical applications remains elusive.

SUMMARY

Embodiments of the present invention reduces or otherwise ameliorates the computational overhead for adaptive access plans for database queries that include host variables, parameter markers and the like.

According to one embodiment of the present invention, an access plan including multiple indexes is selected for accessing data of a database system. A filtering status of each index within the selected access plan is determined based on information available at execution of the selected access plan. The order of the indexes within the selected access plan is modified based on the filtering status of the indexes, and the selected access plan is executed with the modified order of the indexes. The execution of the selected access plan is interrupted in response to accessing a threshold amount of data and the filtering of the indexes of the selected access plan is estimated. A processing order for the indexes is determined based on the estimated filtering. The execution of the selected access plan resumes based on the determined processing order.

One embodiment of the present invention determines the filtering status of each index by optionally comparing the information available at execution to collected statistics of the database system.

One embodiment of the present invention determines a processing order for the indexes by optionally determining the processing order with the indexes having greater estimated filtering processed prior to the indexes having less estimated filtering.

One embodiment of the present invention optionally reverts to a table scan from an index scan based on the filtering status of the indexes within the selected access plan.

One embodiment of the present invention optionally discards one or more subsequent indexes from the selected access plan in response to prior indexes collectively accessing a threshold amount of data.

One embodiment additionally tracks utilization of the indexes within the selected access plan.

One embodiment optionally selects a second access plan with a single index for accessing data of the database system for a second query and determines a filtering status of the index within the second access plan based on information available at execution of the second access plan. It reverts to a table scan from an index scan based on the filtering status of the index within the second access plan.

The present invention can be embodied in system, method and computer program product implementations.

BRIEF DESCRIPTION OF THE DRAWINGS

Generally, like reference numerals in the various figures are utilized to designate like components.

DETAILED DESCRIPTION

Figure 1:
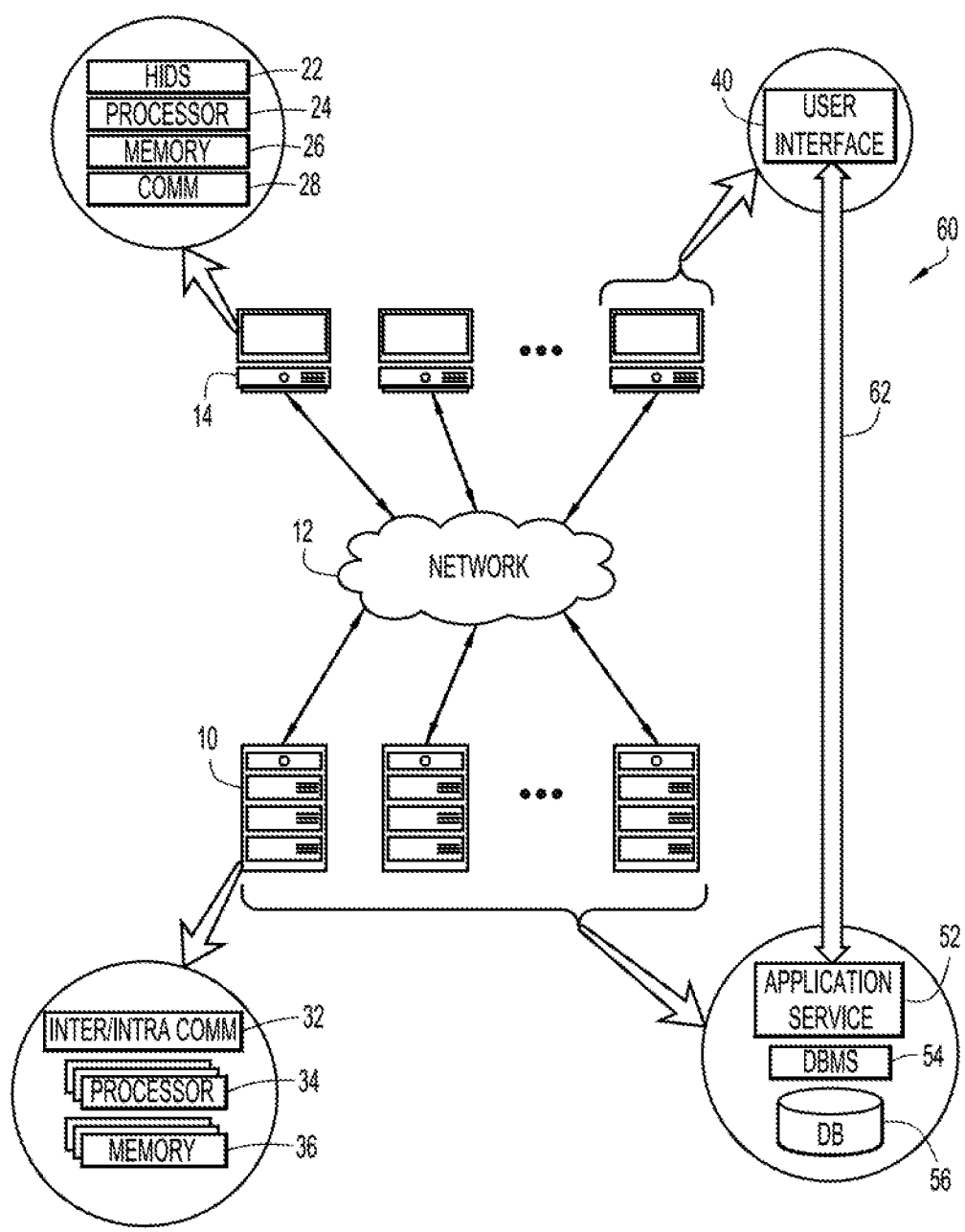
FIG. 1 is a schematic block diagram of an exemplary infrastructure environment in which the present general inventive concept can be embodied.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments.

The figures described herein include schematic block diagrams illustrating various interoperating functional modules. Such diagrams are not intended to serve as electrical schematics and interconnections illustrated are intended to depict signal flow, various interoperations between functional components and/or processes and are not necessarily direct electrical connections between such components. Moreover, the functionality illustrated and described via separate components need not be distributed as shown, and the discrete blocks in the diagrams are not necessarily intended to depict discrete electrical components.

Embodiments of the present invention reduce or otherwise ameliorate the computational overhead for adaptive access plans for database queries that include host variables, parameter markers and the like. Embodiments of the present invention also address the risks associated with inaccurate estimation of selectivity in query statements having host variables, parameter markers and the like. Embodiments of the present invention build an access path that can efficiently adapt at execution time if the initial selectivity estimates do not match reality. Final estimation of selectivity is deferred until query execution without requiring re-optimization of the query statement or of collection of additional statistics once actual literal values are known.

Embodiments of the present invention build a record identifier (RID) based single or multi-index plan, based upon predicates in the query and available indexes. Embodiments quickly evaluate the approximate execution time filtering to rearrange the index order for a multi-index plan or terminate index access and revert to table scan if insufficient index filtering is provided. Decision points in the access plan may be triggered at execution time to perform a more accurate filtering estimation once an initial set of rows are processed. Thus, very short running transactional queries may complete without incurring the overhead of re-estimation of selectivity across indexes. At each decision point, non-filtering indexes are ignored and filtering indexes may be ranked in selectivity order so that more efficient indexes are processed first. Embodiments of the invention may also operate under a single access plan that can adapt at execution time based upon the literals used, as opposed to storing and managing multiple access plans and may also avoid any re-optimization of the access plan, which is beneficial in use cases where the access plan is likely to vary for each execution of the query statement or where there is a risk that a particular access plan may perform poorly when the query is executed using a particular subset of literal values.

An example environment for use with present invention embodiments is illustrated in FIG. 1. Specifically, the environment includes one or more server systems 10 and one or more client or end-user systems 14. Server systems 10 and client systems 14 may be remote from each other and communicate over a network 12. Network 12 may be implemented by any number of suitable communications techniques (e.g., wide area network (WAN), local area network (LAN), Internet, Intranet, etc.). Additionally or alternatively, server systems 10 and client systems 14 may be local to each other, and communicate via any appropriate local communication medium (e.g., local area network (LAN), hardwire, wireless link, Intranet, etc.). For purposes of description and not limitation, client systems 14 may include a communication component 28, by which client systems 14 communicate over network 12, and sever systems 10 may include inter-/intra-network communication components 32, by which server systems 10 communicate with remote client systems 14 over network 12 and by which server systems 10 communicate locally with each other. Other communication configurations are also possible with embodiments of the present invention, as those with skill in the communication networking arts will recognize and appreciate.

Each client system 14 may include a processor 24 and memory 26 by which various computer processes may be stored and executed. Such processes may correspond to any commercially available and custom software (e.g., server/communications software, module, browser/interface software, etc.). Users may operate, control or otherwise interact with such computer processes through human interface devices (HIDs) 22. HIDs 22 may include a display or monitor, a keyboard, a mouse and/or other conventional devices by which humans can interact with a computer. Various computer processes executing on processor 24 may interoperate with HIDs 22 to realize a user interface 40, such as a graphical user interface (GUI). It is to be understood that server systems 10 may also be equipped with HIDs and user interfaces, although such is not illustrated in FIG. 1.

Server systems 10 may include multiple processors 34 and multiple memory components 36. In certain embodiments, processors 34, memory components 36 and inter-/intra-communication components 32 may interoperate to form a mainframe computer, a symmetric multiprocessor (SMP) system, a massively-parallel processing (MPP) system, one or more computer clusters and/or other computing architectures. Upon review of this disclosure, those having skill in the relevant arts will recognize various hardware and software configurations beyond those described herein through which the present invention can be embodied without departing from the spirit and intended scope thereof.

As illustrated in FIG. 1, sever systems 10 and client systems 14 may interoperate in accordance with a service-oriented architecture (SOA) 60 by which an application service component 52 executing on one or more server systems 10 provide application services to one or more client systems 14. Client systems 14 may avail themselves of the application services through a user interface 40, which may be implemented by a special-purpose agent process specifically designed for the application service or user interface may be a general purpose interface process, such as a web browser. User interface component 40 and application service component 52 may transact via one or more communications channels 62 and concomitant communications protocol implemented over network 12 by communication component 28 and inter-/intra-communications component 32.

Application service component 52 may interoperate with a database management system (DBMS) 54, by which a database 56 is maintained and through which database 56 is accessed. SOA 60 thus enables users to, among other things, submit database queries to database 56 via application services provided by application service component 52. In one embodiment, the user is presented with a database search form (not illustrated) via user interface component 40. The user may specify what query information is being sought by entering suitable data in corresponding data entry fields of the search form. The query information may be conveyed to application service component 52 via communication channel 62 and application service component 52 may extract or otherwise process the query information so that a suitable query statement can be provided to DBMS 54. DBMS 54 may perform the query on data stored in database 56 as is described in more detail below. DBMS 54 may return any query results to application service component 52, which may format or otherwise process the query result information for presentation on user interface 40.

In certain embodiments, SOA 60 is constructed or otherwise configured for online transaction processing (OLTP), although the present invention is not so limited. However, those having skill in mission critical or high-volume OLTP systems will recognize and appreciate, upon review of this disclosure, certain advantages and benefits achieved in such systems by embodiments of the present invention, e.g., minimizing regression risk.

Figure 2:
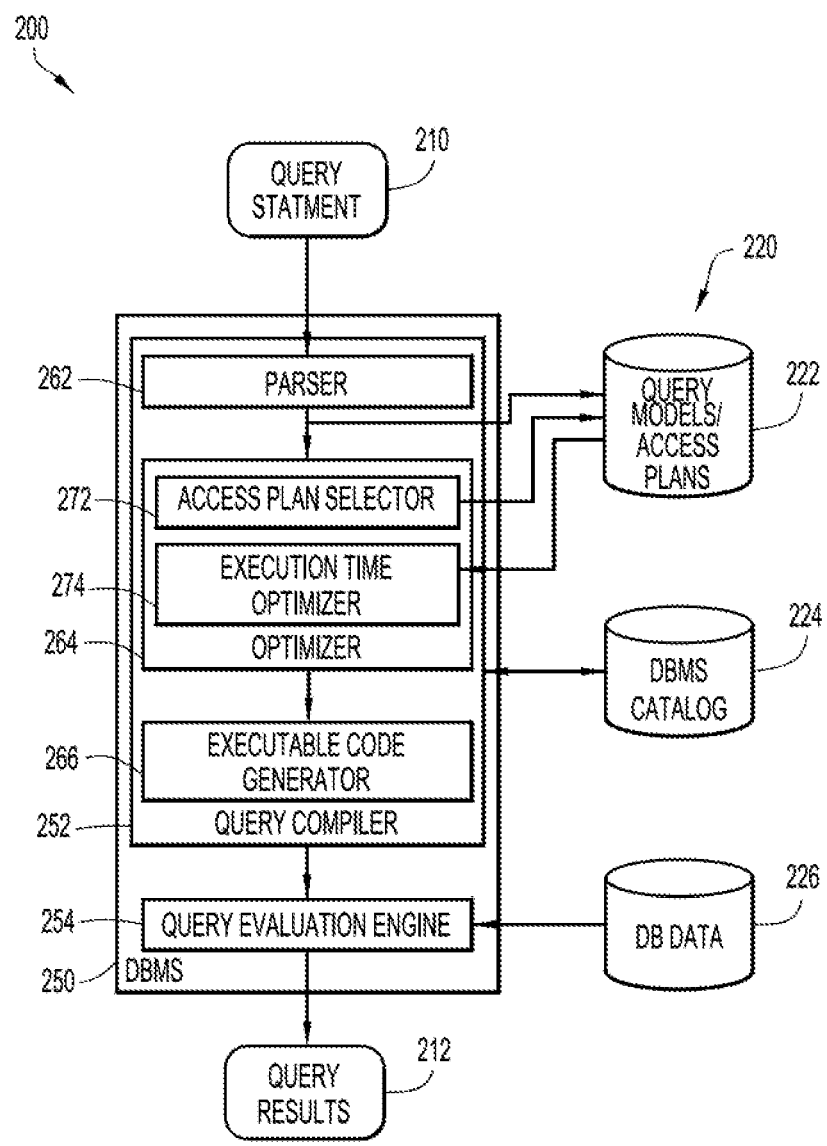
FIG. 2 is a schematic block diagram of an exemplary database system in which the present general inventive concept can be embodied.

FIG. 2 is a schematic block diagram of a database system 200 that can be used in conjunction with embodiments of the present invention. It is to be understood that the functional division among components of database system 200 (discussed below) have been chosen for purposes of explaining the present invention and is not to be construed as a limiting example. Certain components commonly found in database systems may be used in conjunction with embodiments of the present invention, but description thereof is nevertheless omitted here for purposes of conciseness. Those having skill in the relevant arts will recognize numerous database configurations in which the present invention can be practiced without departing from the spirit and intended scope thereof.

Database system 200 may include database storage component 220 comprising, for example, a query model/access plan storage component 222, a DBMS catalog component 224 and a data storage component 226. Query model/access plan storage component 222 may be constructed or otherwise configured to store representations of one or more queries, e.g., queries graphs, and respective access plans generated from those queries. The present invention is not limited to specific implementation details of query model/access plan storage component 222; certain embodiments of the invention utilize a cache system for such storage, e.g., the Environmental Descriptor Manager (EDM) pool or Dynamic Statement Cache utilized in DB2. An access plan associated with a particular query should be retrievable from query/access plan storage component 222 without any re-optimization.

DBMS catalog component 224 may be constructed or otherwise configured to store metadata that define database objects such as table spaces, user-accessible views, value ranges, indexes, user information, and storage groups, etc. Database data storage component 226 may be constructed or otherwise configured to store data on which queries and other analyses can be performed. Upon review of this disclosure, those having skill in database systems will recognize numerous data storage configurations and techniques by which database storage component can be implemented without departing from the spirit and intended scope of the present invention.

Exemplary database system 200 includes a DBMS component 250 that implements functionality by which queries are conducted on data in data storage component 224. DBMS 250 includes a query compiler component 252 that, for purposes of description and not limitation, accepts a query statement 210 and produces a query execution plan that is in turn executed by query evaluation engine 254. Query evaluation engine 254 retrieves or otherwise accesses the data in database data storage component 226 and performs the specific operations thereon specified by the execution plan to generate query results 212.

Query compiler component 252 may include a parser component 262, by which query statements 210 are converted from a high-level language to an internal representation of the query, e.g., a query graph, an optimizer component 264, which is discussed in detail below, and an executable code generator 266, by which the execution plan is produced. Parsing component 262 may analyze query statement 210 to validate the syntax. If any syntax errors are detected, query compiler component 252 may cease processing and may return an appropriate error to the application that submitted the query. When parsing is complete, an internal representation of the query may be stored in query model/access plan storage component 222.

Using the query model as input, optimizer component 264 may generate many alternative execution plans that satisfy the query. To estimate the execution cost of each of these plans, the optimizer may use various statistics for tables, indexes, columns and functions. Optimizer component 264 may choose the execution plan with the smallest estimated execution cost. Optimizer component 262 may use the query model to analyze the query semantics and to obtain information about a wide variety of factors, including indexes, base tables, derived tables, subqueries, correlations, and recursion. In light of such factors, access path selector 272 selects the best access plan for the query, which may be stored in query model/access plan storage component 222. The access plan and the query model may be provided to executable code generator component 266, which creates an executable access plan, or section, for the query.

As illustrated in FIG. 2, exemplary optimizer component 266 includes an execution time optimizer component 274 by which adaptive access plans for queries having host variables, special registers, or parameter markers are generated. In certain embodiments, execution time optimizer component 274 may modify the access plan such that provisions for adaptation are accommodated in the execution plan. For example, access path selector component 272 may select the lowest cost access plan based on default filter factor estimates with parameter markers in place, and execution time optimizer component 274 may specify how the access plan is to be configured for adaptive execution. The configured access plan may be provided to execution time optimizer component 274, which generates suitable code in the execution plan for adaptive optimization, as described below.

DBMS component 250 may include one or more modules or units to perform the various functions of present invention embodiments described below. The various modules (e.g., query compiler component 252, query evaluation engine component 254, parser component 262, access path selector component 272, and execution time optimizer component 274) may be implemented by any combination of any quantity of software and/or hardware modules or units, and may reside within memory 36, 26 of the server and/or client systems for execution by processor 34, 24.

Figure 3:
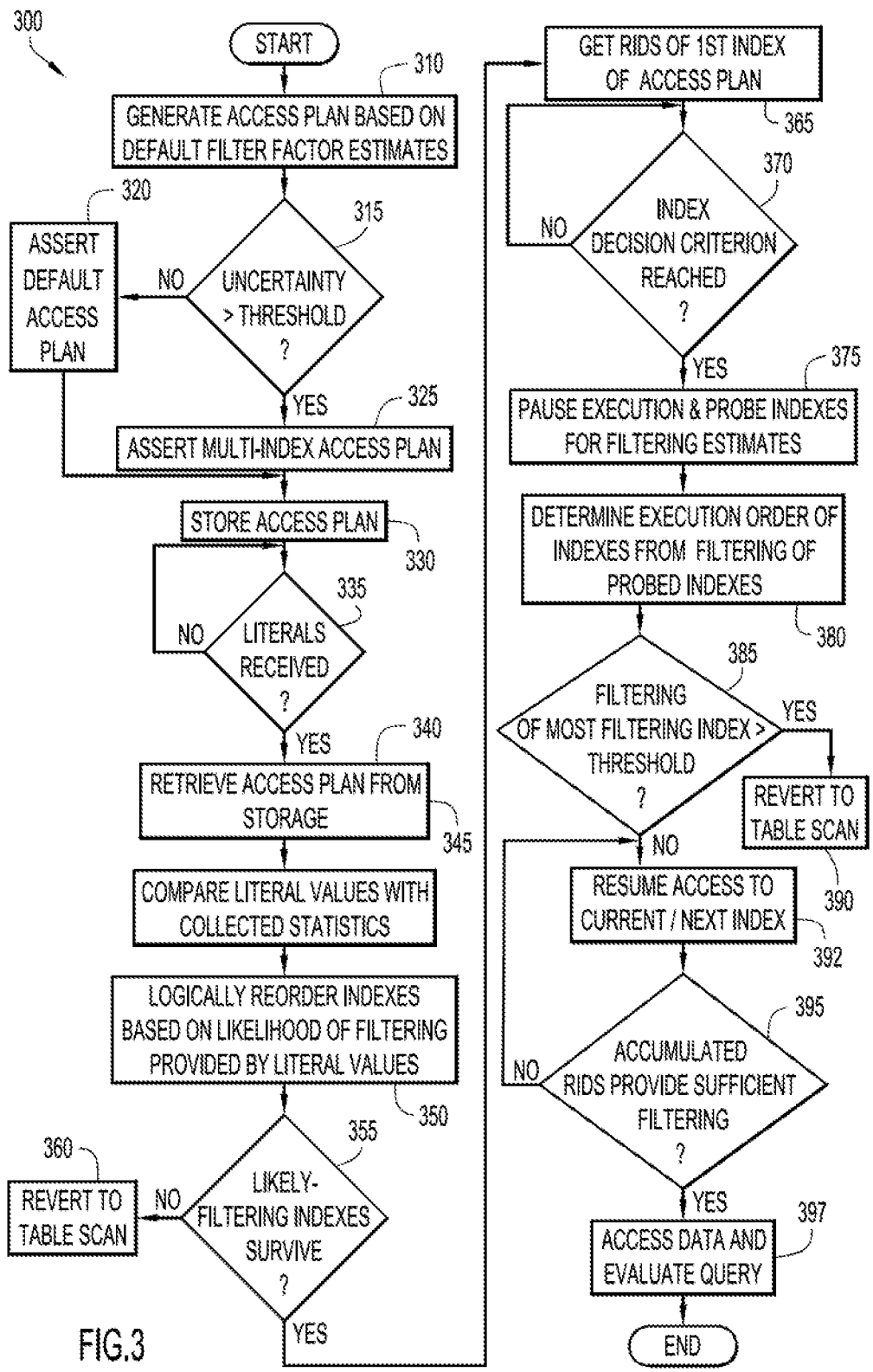
FIG. 3 is a flow diagram of an exemplary query process using an adaptive multi-index access plan embodiment of the present general inventive concept.

FIG. 3 is a flow diagram representing an exemplary database query process 300. In operation 310, query process 300 generates an access plan based on default filter factor estimates given the predicates presented in the query statement. In one embodiment, the average filter factor is computed for each index and access plan selector component 272 may select the index having the lowest cost based on the filter factor estimates. In operation 315, the risk associated with the cost-based plan built at access path selection is compared to a predetermined threshold value. In certain embodiments of the present invention, an uncertainty factor associated with the default filter factor estimate is tracked. In certain embodiments, the uncertainty factor is implemented as a percentage that represents the potential upper range of a predicate. For example, "WHERE C1>?" could produce an execution literal value that qualifies 100% of the range, and thus would be considered to have high uncertainty. Alternatively, "WHERE C2=?" and C2 is unique, the predicate would be considered to have very low uncertainty. For a plan with low uncertainty, as determined in operation 315, process 300 may transition to operation 320 by which the default access plan with the lowest cost is asserted, which may be a single index plan. If high uncertainty exists, e.g., when the uncertainty factor is greater than the threshold, then process 300 may transition to operation 325 by which a multi-index plan is asserted. In one embodiment, the multi-index plan may be comprised of the lowest cost index as the leading index and a backup index as the second index.

In operation 330, the access plan is stored, such as in query model/access plan storage component 222. In operation 335, it is determined whether literal values have been received for one or more parameter markers in the query statement. If so, process 300 may transition to operation 340 in which the corresponding access plan is retrieved from access plan storage, which may coincide with a cache hit on the query statement.

Once the literal values of the query are known, i.e., at execution time, process 300 may transition to operation 345, by which the literal values are compared to collected statistics and/or the maximum possible range to determine if an index in the access plan is "likely filtering" or "unlikely filtering." In one embodiment, the statistical low and high keys are saved (or low2key and high2key used in DB2) when the access plan is originally chosen. Queries that search the whole range between low and high keys would be considered "unlikely filtering", and those that search entirely outside the range of either the low or high keys would be considered "likely filtering".

As an example, assume a column C1 has low2key=1 and high2key=99. Then the following range predicates would be determined to qualify as either likely or unlikely filtering: "WHERE C1>0" would be considered unlikely filtering in that the starting point is below low2key; "WHERE C1 BETWEEN 0 AND 100" would be considered unlikely filtering because the BETWEEN clause includes the entire range; "WHERE C1<100" would be considered unlikely filtering since the starting point is above high2key; "WHERE C1 BETWEENx'00' AND x'FF'" is unlikely filtering since the hex values range from low to hex high key; "WHERE C1>=100" is likely filtering since the sought values are above high2key; and "WHERE C1<1" is likely filtering since the sought after values are below low2key.

Similarly, for a character column and assuming that LASTNAME has low2key="ADAMS" and high2key="ZEPHER," the following range predicates would be determined to qualify as unlikely filtering: "WHERE LASTNAME>' '" is unlikely filtering because starting point is below low2key; "WHERE LASTNAME BETWEEN 'AA' AND 'ZZ'" unlikely filtering because it includes entire range; "WHERE LASTNAME BETWEENx '00' ANDx'FF'" is unlikely filtering because the values range from hex low to hex high keys; and "WHERE LASTNAME LIKE '%'" is unlikely filtering because of the starting wildcard.

Embodiments of the present invention may use such comparison of literal values against the statistical low and high key, e.g., low2key and high2key, values that are stored as part of a routine statistics collection process. This comparison is both efficient and rapid. The accuracy of this execution time filtering evaluation may be improved by storing the high frequency values or histogram statistics to compare against the execution time literal values. However, the tradeoff for improved accuracy is an increase in the overhead of this filtering evaluation, which can compromise performance in a high volume transaction system.

In operation 350, the indexes in the access plan are reordered in accordance with the filtering likelihood provided by the literal values. Embodiments of the present invention may logically move the access plan indexes indicated as "unlikely filtering" to the end of the execution order in a multi-index access plan while those indicated as "likely filtering" would be moved to the beginning. In operation 355, it is determined whether any indexes survive as "likely filtering." If not, process 300 may transition to operation 360, by which the access plan reverts to a table scan.

If likely-filtering indexes remain in the access plan, as determined in operation 355, process 300 may transition to operation 365, by which index access begins with the first index in the current plan execution order and the RIDs of the corresponding index are read. To avoid any regression for short running queries, any further action is deferred until an index decision criterion has been reached, which is determined in operation 370. For example, in one embodiment, the index decision criterion is a threshold on the number of RIDs accessed, such as when one (1) RID block is filled (one RID block contains, for example, 6500 RIDs at 5 bytes for each RID, or 4000 RIDs at 7 bytes per RID). Once the index decision criterion is reached, process 300 may transition to operation 375 in which the first index access pauses, and the subsequent indexes that are not marked as unlikely filtering are probed to determine the approximate filtering of each index. The first (paused) index is also probed to verify its filtering. Certain database systems, such as DB2 for z/OS include index probing as an implemented feature where a matching index probe begins with the given index key, and only the index non-leaf pages are read. Such index probing provides a computationally-inexpensive approximation of filtering. Index probing is utilized by DB2 for z/OS for access path selection when literals are provided in the original query. Certain embodiments of the present invention extend the index probing technique to estimate the filtering of each index leg at execution time when the query contains parameter markers at access path selection. It is to be understood, however, that the present invention is not limited to DB2 and similar or analogous index probing can be implemented in other database systems that fall within the spirit and intended scope of the present invention.

In certain implementations, index probing estimates only the index matching filtering. To address filtering from predicates that are not matching (often referred to as screening), embodiments of the present invention may allow each index to fill 1 RID block to completion before triggering index probing. Such operation is useful in systems where a RID only qualifies to be included after both matching and screening. A count of the number of leaf pages read to fill 1 RID block will provide a sufficient estimate of the filtering from non-matching (screening) predicates for each index. This total index filtering can be used in the index reordering decision.

The first index access terminating before filling 1 RID block may indicate that fewer than a full RID block (e.g., 6500 RIDs) qualified, and the original estimate or the quick estimate of likely/unlikely filtering can be used to determine if remaining indexes are processed or discarded.

If the decision is made to continue with the remaining access plan indexes, then once the index probing returns from each index leg, process 300 may transition to operation 380, by which the estimated filter factor of the probed indexes may be used to determine the execution order of each index leg. If the most filtering leg is greater than an estimated threshold, as determined in operation 385, then the decision is made to revert to a table scan in operation 390. Otherwise, access plan execution of process 300 may transition to operation 392, by which access is resumed with the original index or with the next index determined to be filtering. Once the RIDs have been accumulated with sufficient combined filtering of multiple legs, as determined in operation 395, process 300 may transition to operation 397, by which the combined RID list is used to begin accessing the data rows to evaluate the query and the remaining index legs are discarded. Otherwise, process 300 may return to operation 392, by which RIDs corresponding to additional index legs are accumulated.

The thresholds to determine when a index leg should be kept or discarded at each step, or whether the index plan should revert to table scan may be based on a variety of factors such as the index size compared to table size, the index clustering, matching index filtering and total index filtering (matching plus screening), correlation or independence of additional filtering, the cost of sorting or hashing the RID list, and whether there are optimizations to lower RID processing cost such as use of bit strings or other techniques. The present invention is not limited to a particular threshold determination technique; certain thresholds are specific to particular DMBS'.

To improve future execution of the access plan, embodiments of the invention can track which indexes are kept and which are discarded at each execution. This allows for alternative plans to take advantage of this knowledge. Embodiments can automatically mark, within a chosen access plan, those indexes that are continually discarded as "unlikely filtering" before the query executes. This can be as simple as keeping a count within the plan of the number of executions of the query, and a count for each index leg as to how many times it is utilized.

Embodiments of the invention are further exemplified through the following examples.

EXAMPLE 1

Index IDX1 (C1), IDX2 (C2)
TABLE has 10 million rows. C1 has 2 million distinct values, and C2 has 100,000 distinct values.
  SELECT *
  FROM TABLE
  WHERE C1=?
  AND C2=?

In this example, column C1 has 2 million distinct values, meaning that each C1 value qualifies approximately 5 rows. However, collected statistics reveal that one particular value (blank) qualifies 20% of the data. Column C2 qualifies 100 rows on average, with a worst case value qualifying 1000 rows.

A cost based query optimizer would reasonably choose a matching single index plan using IDX1, which is the optimal plan for majority of values searched (qualifying approx. 5 rows on average). However, such a plan would be a disaster if C1=' ' is searched since 20% of the 10 million rows would be accessed. For single index plans, IDX2 is inferior since it typically qualifies 100 rows per execution, compared with 5 rows on average for IDX1.

Embodiments of the present invention may require the query optimizer to recognize the risk of choosing only IDX1. A high uncertainty indicates the risk associated with filter factor of IDX1, and embodiments of the present invention would result in a multi-index plan being chosen—with IDX1 as the first index in the plan and IDX2 as the second index in the plan. Embodiments of the present invention may assert that the "best average single index" is chosen as the first index in the multi-index access plan such that this index is the only one utilized when a highly filtering literal value is provided at execution time, and the backup index would only be triggered if a poorly filtering literal value provided.

At execution time, neither index would be marked "unlikely filtering", and thus IDX1 is allowed to begin processing. If a value other than blank is searched, then approximately five (5) RIDs would qualify, and IDX2 would not be processed. If one (1) RID block is accumulated, then this means that 6500 RIDs were accumulated from IDX1. IDX1 access would pause and IDX2 would be probed and determined to qualify a much smaller percentage. IDX2 would then be accessed and the list of RIDs from IDX2 would be utilized (since it is significantly less than the 6500 from IDX1). The IDX1 RIDs would be discarded without the need to further evaluate whether more than the original 6500 RIDs are qualified.

EXAMPLE 2

Index IDXC1 (LASTNAME), IDXC2 (FIRSTNAME), IDXC3(ADDRESS), IDXC4(CITY), IDXC5(ZIPCODE), IDXC6 (BIRTHDATE)
  SELECT *
  FROM CUSTOMER
  WHERE LASTNAME LIKE?
  AND FIRSTNAME LIKE?
  AND ADDRESS LIKE?
  AND CITY LIKE?
  AND ZIPCODE BETWEEN? AND?
  AND BIRTHDATE BETWEEN? AND?

Example 2 is a simplified example of a generic search screen. Since the query is coded with parameter markers or variables, the actual filtering of each predicate is unknown at access path selection time. The user may enter any combination of the six (6) options. For this type of query and the six (6) single column indexes on each of the six (6) columns, the optimizer would recognize the high uncertainty factor and choose a multi-index plan with one index leg for each of the six (6) predicates.

At 1st execution, the user may search for last name 'SMITH', having a birth date in '1960' and city of 'SAN JOSE'. Thus, the query statement at execution becomes:
  SELECT *
  FROM CUSTOMER
  WHERE LASTNAME LIKE 'SMITH'
  AND FIRSTNAME LIKE '%'
  AND ADDRESS LIKE '%'
  AND CITY LIKE 'SAN JOSE'
  AND ZIPCODE BETWEEN 00000 AND 99999

AND BIRTHDATE BETWEEN 'Jan. 1, 1960' AND 'Dec. 31, 1960'

The supplied values are used, and those not supplied are substituted with the wildcard '%' for the LIKE operator and/or the entire range for the BETWEEN operator.

Embodiments of the invention may determine that both FIRSTNAME LIKE '%' and ADDRESS LIKE '%' are unlikely filtering due to the wildcard ('%'). Also ZIPCODE BETWEEN 00000 AND 99999 would be classified as unlikely filtering due to the range including the entire low and high values represented by the statistics stored for this column. Thus, IDXC2, IDXC3 and IDXC5 legs would all be marked as unlikely filtering and moved to the end of the index execution sequence. No indexes are marked as likely filtering for the initial check, and the execution order begins with the original estimated order for the remaining three (3) indexes.

Assume the first index in the access plan is IDXC1 on LASTNAME LIKE 'SMITH'. Since this is a common last name, then it reasonably considered likely that greater than 6500 rows may qualify. Accordingly, once the first RID block is filled, then execution pauses, and index probing occurs for this index (IDXC1) and IDXC4 (CITY) and IDXC6 (BIRTHDATE) to validate the filtering for each index. Assume the returned estimates are IDXC1 is 3% filtering, IDXC4 is 1% filtering and IDXC6 is 2% filtering as determined by index probing. In such instance, the indexes may be reordered to execute IDXC4, then IDXC6, and finally IDXC1. In certain embodiments, IDXC1 can begin from its last position before it was paused. Combined filtering of IDXC4 and IDXC6 may dictate that a small enough result is qualified and IDXC1 can be skipped.

EXAMPLE 3

This example contains indexes with the same columns repeated to demonstrate how the decision to keep or discard indexes can be dependent on overlapping filtering from preceding indexes.

Index IDXA(C1, C2), IDXB(C2, C3), IDXC(C3, C1)
SELECT *
FROM TABLE
WHERE C1>?
AND C2>?
AND C3>?

A multi-index plan is chosen at access path selection, with the order IDXA, IDXB, IDXC. Access path selection tracks the overlap of filtering, such that indexes can be discarded if the filtering is already applied by a prior index.

For example, assuming C1 provides 2% filtering, C2 provides 3% filtering and C3 provides 20% filtering as determined from index probing. The execution order based upon this filtering is IDXA (C1, C2), IDXB (C2, C3), IDXC (C3, C1). However, IDXC can be discarded, because all of the filtering is already applied by IDXA and IDXB which contain columns C2 and C3 within those indexes. Also, the C3 filtering may be insufficient in this case, and the C2 filtering (of 3%) is already included as non-matching (screening) from IDXA, so the decision may be made to also discard IDXB.

For a subsequent execution of the access plan, the filtering may be C1 is 15% filtering, C2 is 10% filtering and C3 is 10% filtering. In this case, the order after index probing may be IDXB, IDXC, IDXA. IDXA would however be discarded, due to filtering provided as matching and non-matching (screening) for all three columns already being applied from the first two indexes.

The previous examples have been based on multi-index ANDing (intersection). If the access path chosen is a single index access path, then the quick likely/unlikely filtering check is applicable to determine if the access path should revert to a table scan. If the index plan remains, then once one (1) RID block is full, then index probing can further validate if the index access plan should continue, or the plan should revert to a table scan.

The existence of OR conditions may result in the query becoming a candidate for multi-index ORing. All aspects of the embodiments described above also apply, however with index ORing, the desired execution order is from least filtering to most filtering—which is the reverse of the order for multi-index ANDing.

EXAMPLE 4

Index IDX1 (C1), IDX2 (C2)
SELECT *
FROM TABLE
WHERE C1>?
OR C2>?

In example 4, the query optimizer may choose a multi-index OR plan, with IDX1 and IDX2 execution order. At execution time, the likely/unlikely filtering check may determine that, due to a non-filtering leg, approximately all rows will qualify, and thus the plan should revert to a table scan. If an index plan remains after the likely/unlikely filtering check, then filling one (1) RID block on the first index will trigger index probing of both indexes. The decision to keep the index plan or revert to table scan will be based upon the index probing results.

In a multi-index ORing plan, it is not possible discard any single index, since the row may qualify from any of the OR conditions. Any single OR index that is not filtering will render the whole plan non-filtering.

For compound AND/OR combinations, the decisions regarding the filtering of any individual index must propagate to its parent AND/OR, and the appropriate decision as to keep, reorder or discard an index when the parent is an AND, or keep the index plan or revert to table scan if the parent is an OR.

It will be appreciated that the embodiments described above and illustrated in the drawings represent only a few of the many ways of implementing embodiments for database queries using adaptive multi-index access plans.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, profile generation module, profile comparison module, etc.). These systems may include any types of monitors and input devices (e.g., keyboard, mouse, voice recognition, etc.) to enter and/or view information.

It is to be understood that the software (e.g., DBMS) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., DBMS) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., query statements), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The reported query results 212 may include any information arranged in any fashion, and may be configurable based on rules or other criteria to provide desired information to a user.

The present invention embodiments are not limited to the specific tasks or algorithms described above, but may be utilized for database queries.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention embodiments has been presented for purposes of illustration and description, but is not intended to be exhaustive or limited to the invention in the form disclosed. Many modifications and variations will be apparent to those of ordinary skill in the art without departing from the scope and spirit of the invention. The database system embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of modifying a database access plan during execution comprising:
    selecting an access plan for accessing data of a database system, wherein the access plan includes a plurality of indexes;
    determining a filtering status of each index within the selected access plan based on information available at execution of the selected access plan;
    modifying an order of the indexes within the selected access plan based on the filtering status of the indexes;
    executing the selected access plan with the modified order of the indexes, wherein the order of the indexes is changed during execution of the selected access plan by:
        interrupting execution of the selected access plan in response to accessing a threshold amount of data;

estimating filtering of the indexes of the selected access plan;

determining a different processing order for the indexes based on the estimated filtering; and resuming execution of the selected access plan from a next index of the determined processing order.

2. The method of claim 1, wherein selecting an access plan further comprises:

selecting the access plan based on selectivity and a corresponding uncertainty for the selectivity.

3. The method of claim 1, wherein determining a filtering status of each index within the selected access plan further comprises:

determining the filtering status of each index within the selected access plan by comparing the information available at execution to collected statistics of the database system.

4. The method of claim 1, wherein determining a different processing order for the indexes based on the estimated filtering further comprises:

determining the different processing order with the indexes having greater estimated filtering processed prior to the indexes having less estimated filtering.

5. The method of claim 1, further comprising:

reverting to a table scan from an index scan based on the filtering status of the indexes within the selected access plan.

6. The method of claim 1, further comprising:

discarding one or more subsequent indexes from the selected access plan in response to prior indexes collectively accessing a threshold amount of data.

7. The method of claim 1, further comprising:

tracking utilization of the indexes within the selected access plan.

8. The method of claim 1, further comprising:

selecting a second access plan with a single index for accessing data of the database system for a second query;

determining a filtering status of the index within the second access plan based on information available at execution of the second access plan; and reverting to a table scan from an index scan based on the filtering status of the index within the second access plan.

* * * * *